(12) United States Patent
Nishibori

(10) Patent No.: US 7,091,866 B2
(45) Date of Patent: Aug. 15, 2006

(54) PORTABLE TELEPHONE SET WITH CRIME PREVENTION FUNCTION

(75) Inventor: Takahisa Nishibori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/348,185

(22) Filed: Jan. 21, 2003

(65) Prior Publication Data

US 2003/0137422 A1 Jul. 24, 2003

(30) Foreign Application Priority Data

Jan. 21, 2002 (JP) ............................. 2002-011752

(51) Int. Cl.
*G08B 13/00* (2006.01)
*G08B 21/00* (2006.01)
*G08B 13/14* (2006.01)
*H04M 11/04* (2006.01)
*H04M 1/00* (2006.01)
*H04N 7/14* (2006.01)

(52) U.S. Cl. ..................... 340/574; 340/540; 340/571; 340/692; 348/14.01; 348/14.02; 348/14.03; 348/14.04; 455/404.1; 455/556.1; 455/575.1

(58) Field of Classification Search ............ 340/573.1, 340/540, 571, 692, 574; 348/14, 17, 148, 348/149, 158, 14.01, 14.02, 14.03, 14.04; 455/556, 575, 521, 404, 404.1, 556.1, 575.1; 362/109, 88, 24
See application file for complete search history.

(56) References Cited

U.S. PATENT DOCUMENTS

| | | | |
|---|---|---|---|
| 4,884,132 A | | 11/1989 | Morris et al. |
| 5,712,679 A | | 1/1998 | Coles |
| 5,726,660 A | * | 3/1998 | Purdy et al. .............. 342/357.1 |
| 5,893,037 A | * | 4/1999 | Reele et al. ............. 455/556.1 |
| 6,254,249 B1 | * | 7/2001 | Kim et al. .................. 362/109 |
| 6,278,884 B1 | * | 8/2001 | Kim ......................... 455/556.1 |
| 6,285,867 B1 | * | 9/2001 | Boling et al. ............ 455/404.1 |
| 6,392,697 B1 | * | 5/2002 | Tanaka et al. ........... 348/220.1 |
| 6,473,631 B1 | * | 10/2002 | Siddoway et al. ....... 455/575.1 |
| 6,518,993 B1 | * | 2/2003 | Kerai et al. .............. 348/14.01 |
| 6,535,127 B1 | * | 3/2003 | Taylor ........................ 340/571 |
| 6,577,234 B1 | * | 6/2003 | Dohrmann .................. 340/540 |

FOREIGN PATENT DOCUMENTS

| | | |
|---|---|---|
| CA | 1238386 | 6/1988 |
| DE | 19913019 A1 | 2/2001 |
| GB | 2260880 | 4/1993 |
| GB | 2308707 | 7/1997 |
| GB | 2349253 | * 10/2000 |

(Continued)

OTHER PUBLICATIONS

United Kingdom Search Report dated Jul. 16, 2003.

*Primary Examiner*—Daniel Wu
*Assistant Examiner*—Lam Pham
(74) *Attorney, Agent, or Firm*—Scully, Scott, Murphy & Presser, P.C.

(57) ABSTRACT

When an emergency push-button is depressed, an alarm sound output part in a portable telephone set outputs a high volume level alarm sound, and a flashlight part 8 emits light or flickered light. Furthermore, at the time of the light emission from the flashlight part 8, a camera 7 picks up an evidence photograph and causes the picked-up photograph to be automatically transmitted to a predetermined mail address of police or a guard company.

2 Claims, 2 Drawing Sheets

FOREIGN PATENT DOCUMENTS

| | | |
|---|---|---|
| JP | 6-223276 | 8/1994 |
| JP | 8-84613 | 4/1996 |
| JP | 9-62956 | 3/1997 |
| JP | 11-86156 | 3/1999 |
| JP | 11-259785 | 9/1999 |
| JP | 2001-103454 | 4/2001 |
| JP | 2001-109976 | 4/2001 |

* cited by examiner

PORTABLE TELEPHONE SET WITH CRIME PREVENTION FUNCTION

BACKGROUND OF THE INVENTION

This application claims benefit of Japanese Patent Application No. 2002-011752 filed on Jan. 21, 2002, the contents of which are incorporated by the reference.

The present invention relates to portable telephone sets with crime prevention function and crime prevention adapters for portable telephone set capable of informing emergency situations.

Crime prevention bells and portable crime prevention buzzers are well known in the art as portable crime prevention device for outputting an alarm sound to inform an emergency situation in the event of attack by a molester or a thug.

As recently extremely popularized portable telephone sets, those having a crime prevention function have been considered. For example, Japanese Patent Laid-Open No. 2001-109976 discloses a portable crime prevention device with a crime prevention function, which can output an alarm sound, provided at a portable telephone set terminal.

The prior art portable telephone set terminal, however, is provided with the crime prevention function, which can output alarm sound alone, and thus can only inform an emergency situation to the surroundings. Besides, in a high ambient noise level place or a very congested place, it is sometimes difficult with the sole alarm sound to inform an emergency situation to the surroundings.

In the meantime, portable telephone sets with flashlight part are commercially available. However, the flashlight part is used only for the purpose of picking up a photograph to be attached to an electronic mail with a digital camera.

SUMMARY OF THE INVENTION

Accordingly, the present invention has an object of providing a portable telephone set with crime prevention function and a crime prevention adapter for a portable telephone set, in which a flashlight part is utilized for a crime prevention function.

To attain the above object, the present invention features in using both alarm sound and flashlight (or strobo) as crime prevention functions of the portable telephone set. With light from the flashlight part, an emergency situation can be informed even in a high ambient noise place. By using the two informing means, i.e., the alarm sound and the flashlight, it is possible to reliably inform the emergency situation to the surroundings. Also, in case when the user is attacked by a theft, a molester or a thug in darkness, flashlight can be emitted in addition to the alarm sound output as crime prevention function, thus dazzling the eyes of the attacker. Thus, it is possible to excite not only the sense of hearing but also the sense of sight to let the attacker be deranged very effectively.

At the time of the flashlight emission, a camera picks up an evidence photograph, which is automatically transmitted to a predetermined address of police or a guard company by using an electronic mail transmission function of a portable telephone set. Thus, it is possible to inform the emergency situation to the police or the guard company, and also leave the evidence photograph.

According to a first aspect of the present invention, there is provided a portable telephone set with crime prevention function comprising an alarm sound generator, a flashlight part and an emergency push-button, wherein: in response to the depression of the emergency push-button an alarm sound is generated and outputted, and light or flickered light is emitted from the flashlight part.

According to a second aspect of the present invention, there is provided a portable telephone set with crime prevention function comprising a flashlight part, a digital camera, an emergency push-button and electronic mail transmission function, wherein: in response to the depression of the emergency push-button, the flashlight part emits light, and also the digital camera picks up a photograph and causes the picked-up photograph to be automatically transmitted to a predetermined mail address.

According to a third aspect of the present invention, there is provided a crime prevention adapter for use in connection to a portable telephone set, comprising an alarm sound generator, a flashlight and an emergency push-button, wherein: in response to the depression of the emergency push-button, the alarm sound generator generates and outputs an alarm sound, and the flashlight part emits light or flickered light.

According to a fourth aspect of the present invention, there is provided a crime prevention adapter for use in connection to a portable telephone set having an electronic mail transmission function, comprising a flashlight part, a digital camera and an emergency push-button, wherein: in response to the depression of an emergency push-button, the flashlight part emits flashlight, and the digital camera picks up a photograph and causes the picked-up photograph to be automatically transmitted from the portable telephone set to a predetermined mail address.

According to a fifth aspect of the present invention, there is provided a crime prevention adapter for use in connection to a portable telephone set having a flashlight part and comprising an alarm sound generator and an emergency push-button, wherein: in response to the depression of the emergency push-button, the alarm sound generator generates and outputs an alarm sound, and the flashlight part of the portable telephone set emits light or flickered light.

According to a sixth aspect of the present invention, there is provided a crime prevention adapter for use in connection to a portable telephone set having a flashlight part, a digital camera and an electronic mail transmission function, wherein: in response to the depression of the emergency push-button, the flashlight part in the portable telephone set emits light, and the digital camera picks up a photograph and causes the picked-up photograph to be automatically transmitted to a predetermined mail address.

According to a seventh aspect of the present invention, there is provided a crime prevention adapter for use in connection to a portable telephone set having an alarm sound generator and an emergency push-button and comprising a flashlight part, wherein: in response to the depression of the emergency push-button in the portable telephone set, the flashlight part emits light or flickered light.

According to an eighth aspect of the present invention, there is provided a crime prevention adapter for use in connection with a portable telephone set having an emergency push-button and an electronic mail transmission function and comprising a flashlight part and a digital camera, wherein: in response to the depression of the emergency push-button in the portable telephone set, the flashlight part emits light, and digital camera picks up a photograph and causes the picked-up photograph to be automatically transmitted from the portable telephone set to a predetermined mail address.

Other objects and features will be clarified from the following description with reference to attached drawings.

PREFERRED EMBODIMENTS OF THE INVENTION

Preferred embodiments of the present invention will now be described with reference to the drawings.

Figure 1:
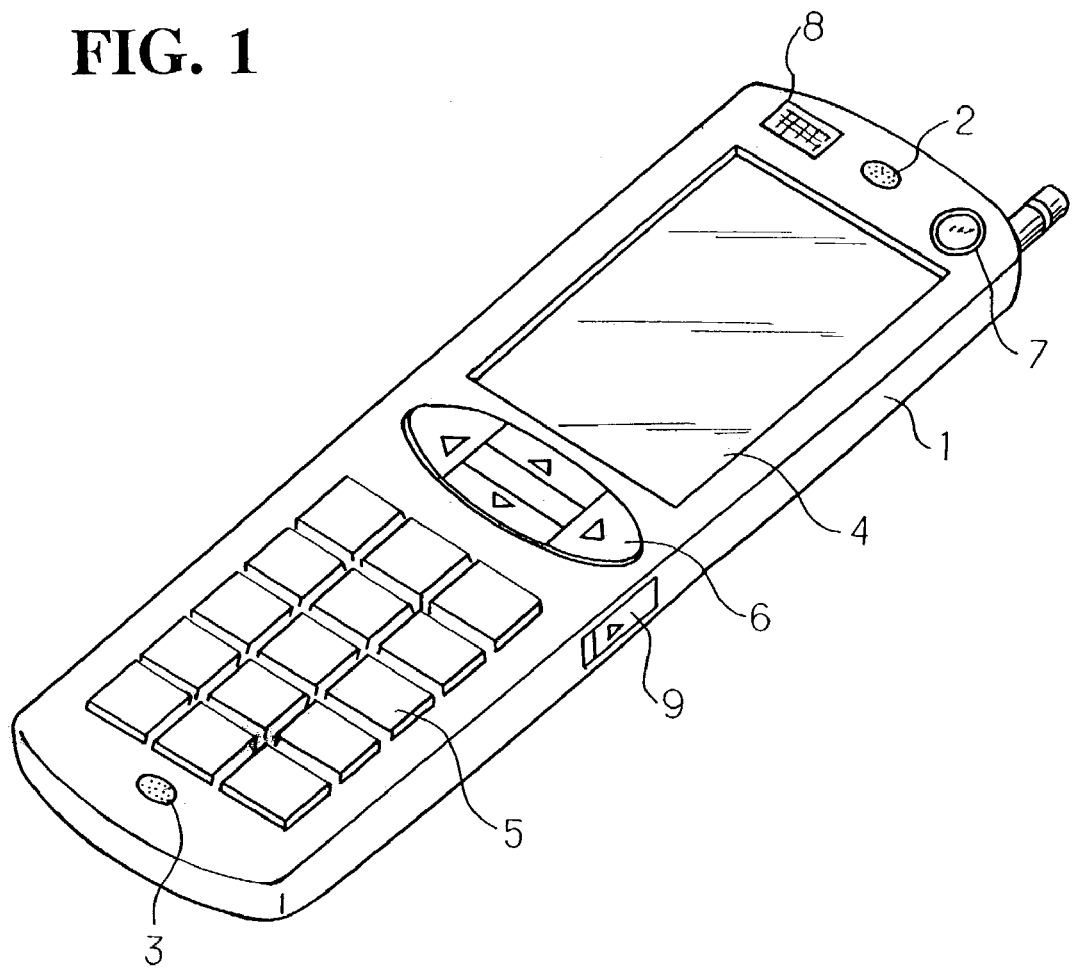
FIG. 1 is a perspective view showing a portable telephone set with crime prevention function according to the present invention.

FIG. 1 is a perspective view showing a portable telephone set with crime prevention function according to the present invention. The portable telephone set with crime prevention function according to the present invention comprises a body 1, a receiver opening part 2, a transmitter opening part 3, an LCD 4, a dial key set 5, a four-direction/determination key 6, a camera (i.e., digital camera) 7, a flashlight part (i.e., strobo) 8 and an emergency push-button part 9. This portable telephone set has an internet connection function and an electronic mail transmitting/receiving function. For the electronic mail transmitting/receiving function may be used either a mail transmission and reception based on a message exchange system provided in the portable telephone set or internet mail transmission and reception based on internet connection.

Figure 2:
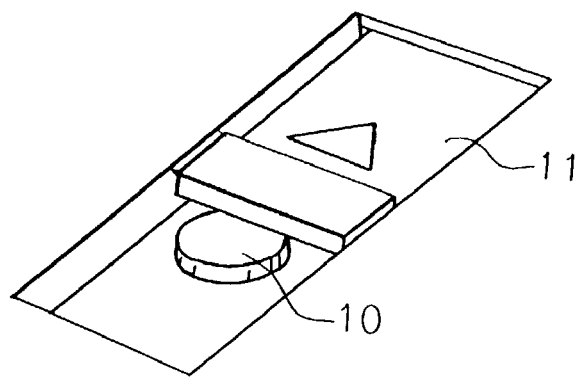
FIG. 2 is an enlarged-scale view showing the emergency push-button part 9 in FIG. 1.

FIG. 2 is an enlarged-scale view showing the emergency push-button part 9. In the usual state of use of the portable telephone set with crime prevention function according to the present invention, an emergency push-button is protected by an emergency push-button cover 11 so that it cannot be depressed in an usual use. At an emergency time, the cover 11 is caused to slide in the direction or arrow to expose the concealed emergency push-button 10, and now the emergency push-button 10 can be depressed.

When the emergency push-button 10 is depressed, an alarm sound output part (not shown) in the portable telephone set outputs a high volume level alarm sound, and also the flashlight part 8 emits light or flickered light. Furthermore, at the time of the light emission from the flashlight part 8, the camera 7 picks up an evidence photograph, and causes this photograph to be automatically transmitted to a predetermined mail address such as that of police or a guard company. For the transmission of the photograph to the predetermined mail address may be used mail transmission based on a message exchange system in the potable telephone set or an internet main transmission based on internet connection.

Further, a very powerful crime prevention system will be constructed such that the portable telephone set has a position specifying function such as GPS (Global Positioning System) or PHS (Personal Handyphone System), that the position data of the portable telephone set is also transmitted at the time of the mail transmission to the predetermined mail address of police or a guard company and that the police or guard company, receiving the mail at the predetermined mail address, confirms the emergency situation and sends members to the place corresponding to the position data from the portable telephone set.

Figure 3:
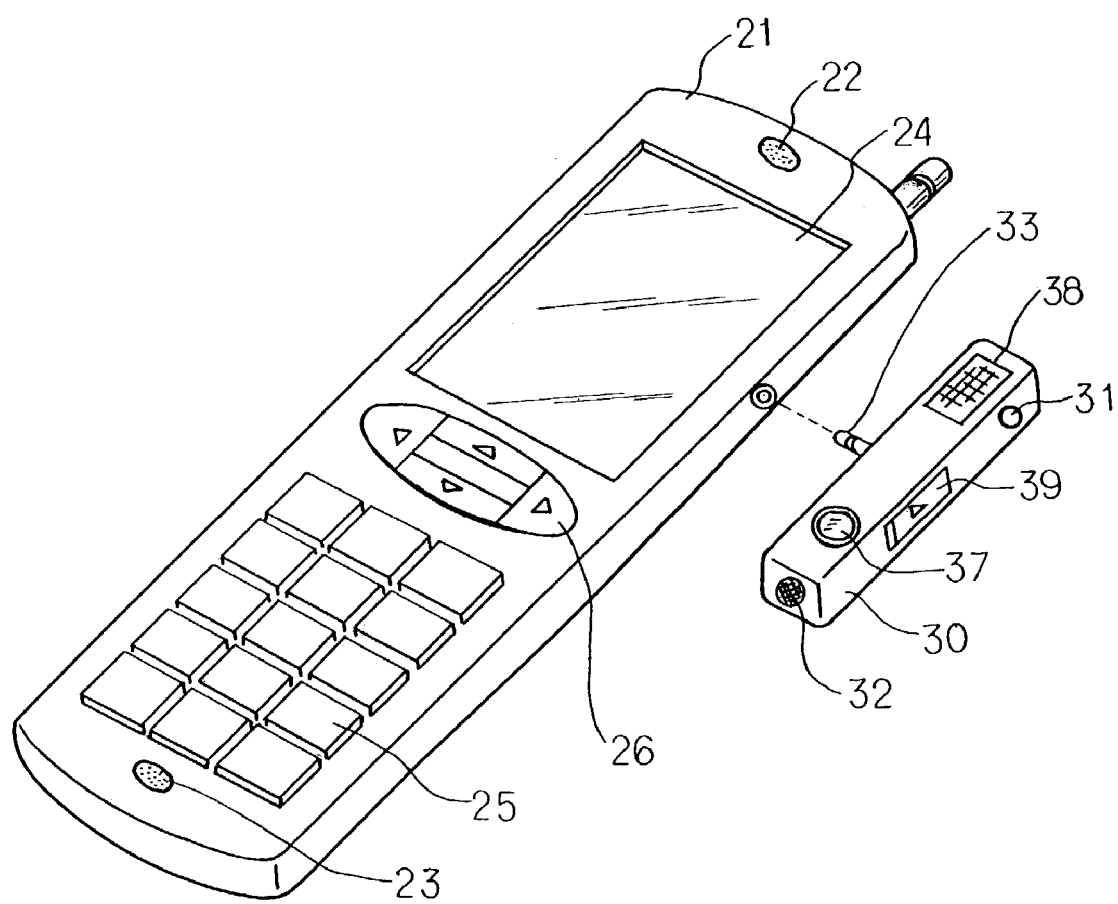
FIG. 3 shows the construction of a different embodiment of the present invention.

FIG. 3 shows the construction of a different embodiment of the present invention. This embodiment includes a crime prevention adapter 30, which has an independent power supply disposed outside a portable telephone set body 21 and connectable by a connection terminal 33 thereto. This portable telephone set comprises a body 21, a receiver opening part 22, a transmitter opening part 23, an LCD 24, a dial key part 25 and a four-direction/determination key 26. This portable telephone set has an internet connection function and an electronic mail transmitting/receiving function. For the electronic mail transmitting/receiving function may be used either mail transmission and reception based on a message exchange system in the portable telephone set or internet mail transmission and reception based on internet connection.

The crime prevention adapter 30 comprises a camera (i.e., digital camera) 37, a flashlight part (i.e., strobo) 38, an emergency push-button part 39, a shutter release button 31, an alarm sound output part 32 and a connection terminal 33.

In operation, when the emergency push-button in the emergency push-button part 39 is depressed, the alarm sound output part 32 outputs an alarm sound, and also the flashlight part 38 emits light or flickered light. Furthermore, at the time of light emission from the flashlight part 38, the camera 37 picks up an evidence photograph and causes the photograph thus picked up to be automatically transmitted from the portable telephone set body to a predetermined mail address of police, a guard company or the like. For the transmission of the photograph to the predetermined mail address may be used mail transmission based on a message exchange system in the portable telephone set or internet mail transmission based on internet connection. As a further alternative, either way of transmission may be selectively set.

This embodiment has an advantage in that with the external provision of the crime prevention adapter the portable telephone set body can be readily miniaturized for portability.

Moreover, in this embodiment, by providing the photographing function with the camera 37, the flashlight part 38, the shutter release button 31 in the portable telephone set body 21 while providing the crime prevention function with the emergency push-button part 39 and the alarm sound output part 32 in the crime prevention adapter 30, it is made possible to enable the purchaser to add a necessary function. In operation, when the emergency push-button in the crime prevention adapter is depressed, the alarm sound output part outputs an alarm sound, and also the flashlight part in the portable telephone body emits light or flickered light. Furthermore, at the time of the light emission from the flashlight part in the portable telephone set body, the camera picks up an evidence photograph, and causes the photograph thus picked up to be automatically transmitted to a predetermined mail address of police, a guard company or the like.

In a converse alternative, the crime prevention function with the emergency push-button part 39 and the alarm sound output part 32 is provided in the portable telephone set body 21, and the photographing function with the camera 37, the flashlight part 38 and the shutter release button 31 is provided in the crime prevention adapter 30. In operation, when the emergency push-button in the portable telephone set body is depressed, the alarm sound output part outputs an alarm sound, while the flashlight part in the crime prevention adapter emits light or flickered light. Furthermore, at the time of the light emission from the flash-light part, the camera picks up an evidence photograph, and causes the photograph thus picked up to be automatically transmitted from the portable telephone set body to predetermined main address of police, a guard company or the like.

As has been described in the foregoing, as a first advantage of the present invention, when informing to the surroundings such an emergency situation that it is difficult to visually recognize things due to darkness or it is difficult to confirm any alarm sound output source due to ambient noise or congestion, the flashlight is caused to emit light or flickered light to let the position be recognized by visual sense while outputting an alarm sound to let the position recognition by the sense of hearing. By activating these two different sensual organs it is possible to let the position be readily specified.

As a second advantage of the present invention, when the user is attacked by a theft, a molester or a thug in darkness, strong light can be directed from the flashlight part to let the target be momentarily deranged.

As a third advantage of the present invention, when the user is attacked by a theft, a molester or a thug, a photograph can be picked up by merely depressing the emergency push-button. That is, an evidence photograph can be instantly picked up without need of any cumbersome application software operation procedure.

As a fourth advantage of the present invention, with the function of automatically transmitting the evidence photograph of the theft, the molester or the thug to the police, a guard company or the like, the emergency situation can be real-time informed to the police, the guard company or the like. Besides, even when the wrongdoer lobs the portable telephone set to destroy the evidence, it is possible to let the evidence remain.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set with a crime prevention function, said portable telephone set having electronic mail transmission capability, said portable telephone set comprising:

an alarm sound generator located on a display face of the portable telephone set;

a flashlight part located on said display face of the portable telephone set;

a digital camera disposed on said portable telephone set; and an emergency push-button located on said portable telephone set, wherein:

in response to the depression of the emergency push-button an alarm sound is generated and outputted from said alarm sound generator in conjunction with an evidence photograph produced by said digital camera transmitted using said electronic mail transmission capability in conjunction with light or flickered light emitted from the flashlight part.

2. A crime prevention adapter for use in connection to a portable telephone set having an electronic mail transmission function, comprising:

an alarm sound generator located on said crime prevention adapter;

a flashlight part, located on said crime prevention adapter;

a digital camera disposed on said crime prevention adapter; and the emergency push-button the alarm sound generator generates and outputs an alarm sound, located on said crime prevention adapter, wherein:

in response to the depression of an emergency push-button, the flashlight part emits flashlight, and, in conjunction, the digital camera picks up a photograph and causes the picked-up photograph to be automatically transmitted from the portable telephone set to a predetermined mail address.

* * * * *